(12) United States Patent
Cairo

(10) Patent No.: US 7,963,747 B2
(45) Date of Patent: Jun. 21, 2011

(54) BRAIDED WIND TURBINE BLADES AND METHOD OF MAKING SAME

(75) Inventor: Ronald R. Cairo, Greer, SC (US)

(73) Assignee: General Electric Company, Schenectady, NY (US)

(*) Notice: Subject to any disclaimer, the term of this patent is extended or adjusted under 35 U.S.C. 154(b) by 154 days.

(21) Appl. No.: 12/417,147

(22) Filed: Apr. 2, 2009

(65) Prior Publication Data

US 2010/0135816 A1  Jun. 3, 2010

(51) Int. Cl.
F03D 11/00 (2006.01)

(52) U.S. Cl. .................. 416/230; 416/241 A; 416/226

(58) Field of Classification Search .............. 416/224, 416/226, 230, 232, 233, 241 R, 241 A
See application file for complete search history.

(56) References Cited

U.S. PATENT DOCUMENTS

| | | | |
|---|---|---|---|
| 3,021,246 A * | 2/1962 | Hutter et al. ............... 156/196 |
| 4,302,155 A * | 11/1981 | Grimes et al. .............. 416/144 |
| 4,585,035 A * | 4/1986 | Piccoli ....................... 138/127 |
| 4,668,318 A * | 5/1987 | Piccoli et al. .............. 156/149 |
| 5,013,216 A | 5/1991 | Bailey et al. |
| 5,018,271 A | 5/1991 | Bailey et al. |
| 5,049,036 A | 9/1991 | Bailey et al. |
| 5,222,297 A | 6/1993 | Graff et al. |
| 5,403,153 A | 4/1995 | Goetze |
| 5,720,597 A | 2/1998 | Wang et al. |
| 5,921,754 A | 7/1999 | Freitas et al. |
| 6,139,278 A | 10/2000 | Mowbray et al. |
| 6,676,080 B2 * | 1/2004 | Violette .................. 244/123.1 |
| 6,986,940 B1 | 1/2006 | Carper |
| 7,147,895 B2 * | 12/2006 | Cundiff et al. ............ 427/289 |
| 7,322,798 B2 | 1/2008 | Cairo |
| 7,393,184 B2 | 7/2008 | Cairo |
| 2003/0012939 A1 | 1/2003 | Carper |
| 2007/0104584 A1 | 5/2007 | Cairo |
| 2007/0154317 A1 | 7/2007 | Cairo |

* cited by examiner

*Primary Examiner* — Ninh H Nguyen
(74) *Attorney, Agent, or Firm* — James W. Pemrick; Ernest G. Cusick; Frank A. Landgraff

(57) ABSTRACT

A blade for a wind turbine and a method for making same are provided. The blade includes a skin having a braided fiber sock. One or more stiffeners are attached to the braided fiber sock.

32 Claims, 3 Drawing Sheets

BRAIDED WIND TURBINE BLADES AND METHOD OF MAKING SAME

BACKGROUND OF THE INVENTION

This invention relates generally to wind turbine blades and more particularly to a braided blade structure and method of making same. Such blades are particularly suitable for (but are not limited to use in) wind turbine configurations.

Generally, a wind turbine includes a rotor having multiple blades. The rotor is mounted on a housing, or nacelle, that is positioned on top of a truss or tubular tower. Utility grade wind turbines (i.e., wind turbines designed to provide electrical power to a utility grid) can have large rotors, e.g., 70 meters (m) (~230 feet (ft)) or more in diameter. Blades, attached to rotatable hubs on these rotors, transform mechanical wind energy into a mechanical rotational torque that drives one or more generators. The generators are generally, but not always, rotationally coupled to the rotor through a gearbox. The gearbox steps up the inherently low rotational speed of the turbine rotor for the generator to efficiently convert the rotational mechanical energy to electrical energy, which is fed into a utility grid. Gearless direct drive turbines also exist.

Contemporary blades are typically at least partially fabricated of a laminated (i.e., layered) fiber/resin composite material. In general, reinforcing fibers are deposited into a resin within a range of predetermined orientations. The fiber orientations are often determined by a range of expected stress and deflection factors that a blade may experience during an expected blade lifetime. The planar interface regions between the laminations are often referred to as interlaminar regions and are normally the weakest element of a composite material. Loads are normally carried in the planes of the laminations and such loads are transferred from the planes of the laminae to an attachment or interface with another component, i.e., the hub. This transfer typically occurs via interlaminar shear, tension, compression, or a combination thereof As a consequence, when load within the laminar planes is increased, stress on the interlaminar regions increases as well. In the event that an interlaminar shear stress limit (i.e., the shearing stress resulting from the force tending to produce displacement between two lamina along the plane of their interface) of an interlamination region is exceeded, the potential for delamination (the separation of a laminated material along the plane of the interlaminar regions) is increased. Delamination results in a reduction in laminate stiffness and may lead to material strain, i.e., elastic deformation of a material as a result of stress.

Some examples of stress factors are vertical wind shear, localized turbulence (including interaction of the rotor with the tower), gravity, wind flow variations and start-stop cycles. Vertical wind shear is typically defined as the relationship between wind speeds and height above the surface of the earth, i.e., altitude. In general, as the altitude increases, wind speed increases. Given a blade can be 35 meters (~115 ft.) or more in length, and the subsequent large diameter of rotation (at least twice the blade length plus the diameter of the associated hub), wind speed can increase 5% to 10% above that at the hub centerline from the hub centerline up to the end of the blade at the blade tip with the blade pointing straight upward. The wind speed may also decrease 5% to 10% below that at the hub centerline from the hub centerline down to the end of the blade at the blade tip with the blade pointing straight downward. As the blades rotate, the cyclic increasing and decreasing of the wind shear induces a cyclic bending moment resulting in both in-plane and interlaminar stresses within the blades.

Localized turbulence includes stationary wakes and bow waves induced by the blades and by the near proximity of the rotating blades to the tower. As the blades rotate through these localized regions, additional in-plane and interlaminar stresses are induced within the blades. Also, as the blades rotate, gravity induces fluctuating bending moments within the blades that also induce in-plane and interlaminar stresses. Cyclic acceleration and deceleration of the blades due to the aforementioned wind flow variations and start-stop cycles induce cyclic stresses on the blades as well.

The blades are typically designed and manufactured to withstand such stresses including the cumulative impact of such stresses in a variety of combinations. The blades are also designed and manufactured to withstand the cumulative impact of a predetermined number of stress cycles, commonly referred to as fatigue cycles. Upon exceeding the predetermined number of fatigue cycles, the potential for material delamination may increase.

As described above, blades are typically attached to a rotating hub at attachment regions designed and fabricated to receive the blades. The blades also have integral attachment regions. The hub and the blade attachment regions act as load transfer regions. For example, the weight of the blades and the aforementioned cyclic stresses are transferred to the hub attachment regions via the blade attachment regions. Also, as described above, the majority of the load is carried through the planes of the laminations except in the immediate vicinity of attachments and interfaces. As blade size and weight increase, the laminations and interfaces of the blade attachment regions may have an increased potential for exceeding interlaminar shear stress limits.

Many fabrication issues can occur with known composite blade strictures, such as, entrained air bubbles, wrinkles, misaligned or off-prescribed orientation fibers and non-uniform compaction. All of these issues, alone or in combination, may lead to unwanted delaminations in the blade.

BRIEF DESCRIPTION OF THE INVENTION

One aspect of the present invention provides, a blade for a wind turbine including a skin having a braided fiber sock. One or more stiffeners are attached to the braided fiber sock.

In another aspect, the present invention provides a blade for a wind turbine. The blade has a skin, which includes an inner braided fiber sock and an outer braided fiber sock. A mandrel connects the inner braided fiber sock to the outer braided fiber sock.

In yet another aspect, the present invention provides a method of making a wind turbine blade. The method includes the steps of, providing a plurality of fibers, braiding the plurality of fibers into a fabric preform and infusing a resin into the fabric preform to form a hardened shell.

It will be seen that many configurations of the present invention can reduce blade weight at tops of towers while giving the designer several ways to adjust the strength and stiffness of blades to achieve improved structural performance.

DETAILED DESCRIPTION OF THE INVENTION

Figure 1:
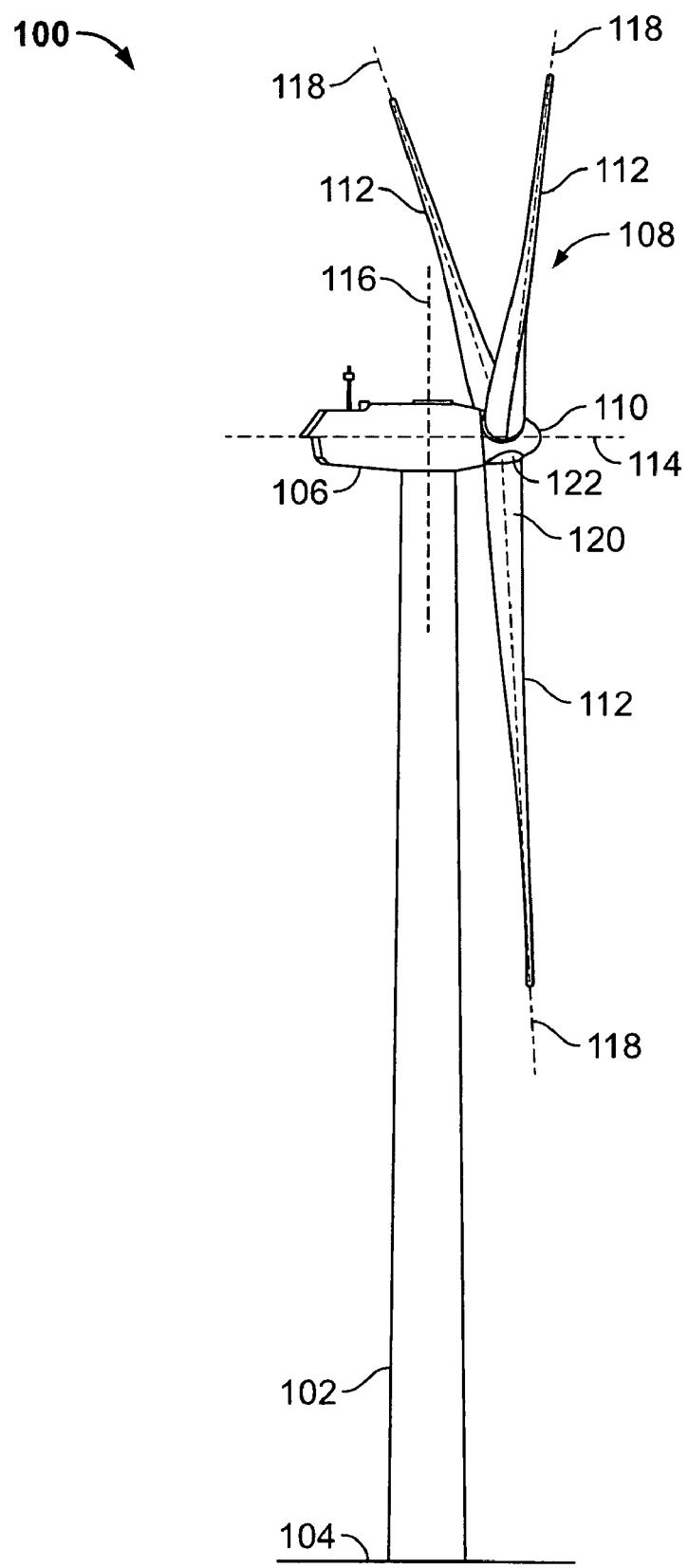
FIG. 1 is a schematic illustration of an exemplary wind turbine system.

FIG. 1 is a schematic illustration of an exemplary wind turbine 100. In the exemplary embodiment, wind turbine 100 is a horizontal axis wind turbine. Alternatively, wind turbine 100 may be a vertical axis wind turbine. Wind turbine 100 has a tower 102 extending from a supporting surface 104, a nacelle 106 mounted on tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. In an alternative embodiment, rotor 108 may have more or less than three rotor blades 112. In the exemplary embodiment, tower 102 is fabricated from tubular steel and has a cavity (not shown in FIG. 1) extending between supporting surface 104 and nacelle 106. In an alternate embodiment, tower 102 is a lattice tower or a combination of lattice and tubular tower construction.

Various components of wind turbine 100, in the exemplary embodiment, are housed in nacelle 106 atop tower 102 of wind turbine 100. For example, rotor 108 is coupled to an electric generator (not shown in FIG. 1) that is positioned within nacelle 106. Rotation of rotor 108 causes the generator to produce electrical power. Also positioned in nacelle 106 is a yaw adjustment mechanism (not shown in FIG. 1) that may be used to rotate nacelle 106 and rotor 108 on axis 116 to control the perspective of blades 112 with respect to the direction of the wind. The height of tower 102 is selected based upon factors and conditions known in the art.

Blades 112 are positioned about rotor hub 110 to facilitate rotating rotor 108 to transfer kinetic energy from the wind into usable mechanical energy, and subsequently, electrical energy. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122.

In the exemplary embodiment, blades 112 may have a length between about 35 meters (m) (~115 feet (ft)) to about 52 m (~171 ft) or more. Alternatively, blades 112 may have any length. As the wind strikes blades 112, rotor 108 is rotated about rotation axis 114. As blades 112 are rotated and subjected to centrifugal forces, blades 112 are subjected to various bending moments and other operational stresses. As such, blades 112 may deflect and/or rotate from a neutral, or non-deflected, position to a deflected position and an associated stress may be induced in blades 112. Moreover, a pitch angle of blades 112, i.e., the angle that determines blades 112 perspective with respect to the direction of the wind, may be changed by a pitch adjustment mechanism (not shown in FIG. 1) to facilitate increasing or decreasing blade 112 speed by adjusting the surface area of blades 112 exposed to the wind force vectors. Pitch axis 118 for blades 112 are illustrated. In the exemplary embodiment, the pitches of blades 112 are controlled individually. Alternatively, blades 112 pitch may be controlled as a group.

In some configurations, one or more microcontrollers in a control system (not shown in FIG. 1) are used for overall system monitoring and control including pitch and rotor speed regulation, yaw drive and yaw brake application, and fault monitoring. Alternatively, distributed or centralized control architectures are used in alternate embodiments of wind turbine 100.

Figure 2:
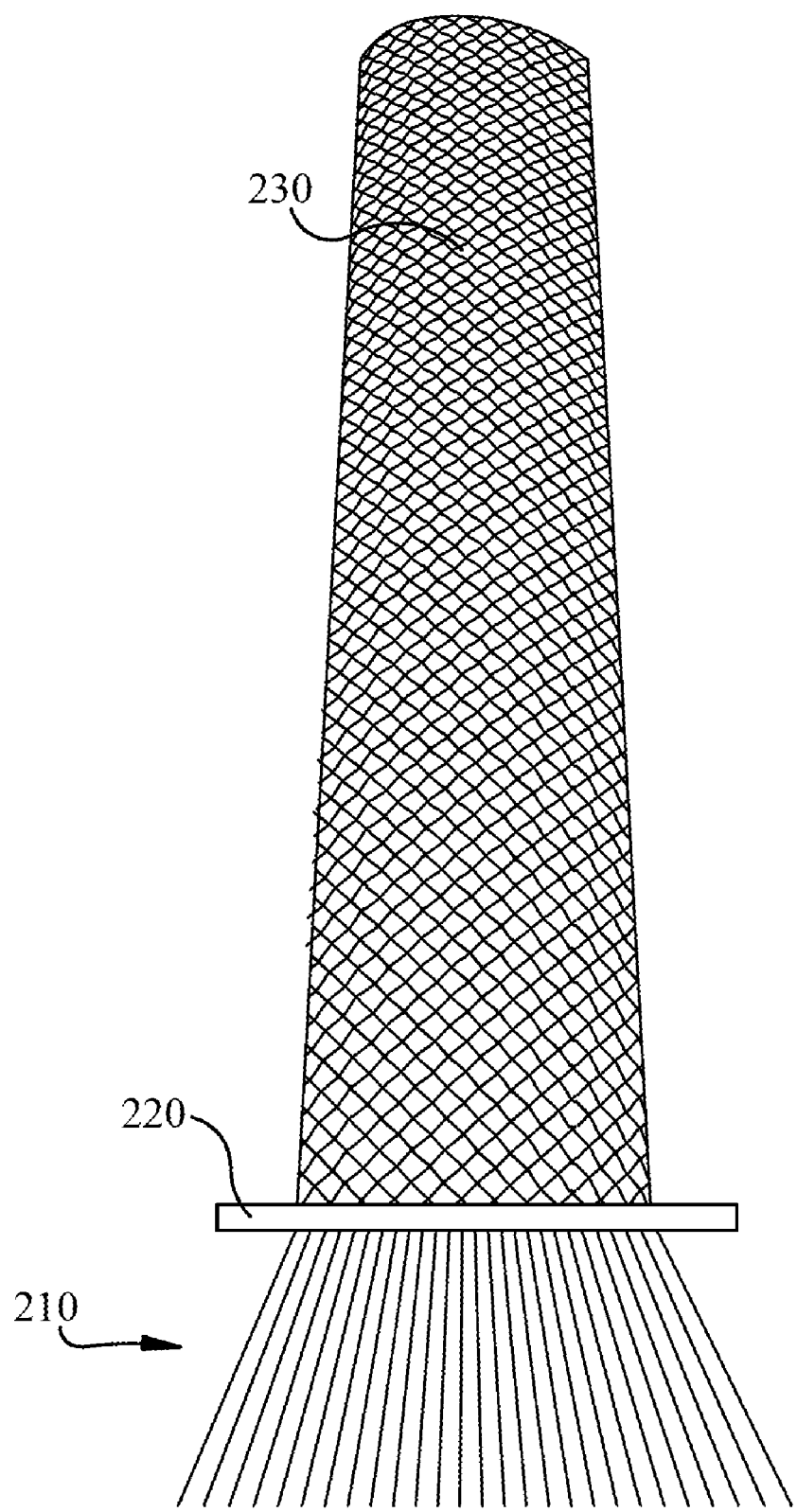
FIG. 2 is an illustration of a blade preform during a braiding process, according to an aspect of the present invention.

FIG. 2 illustrates a wind turbine blade in the process of being fabricated, according to aspects of the present invention. A three-dimensional braiding process is used for forming fiber "socks" by the continuous intertwining of fibers. During the braiding process, a plurality of fibers 210 in a matrix array are moved simultaneously across a braiding frame 220. A fiber extends from a carrier member (not shown) and is intertwined with fibers from other carrier members (not shown) as they are simultaneously moved. The fibers 210 are gathered by the braiding frame 220 and intertwined to form a multi-axial braid. This braiding process is characterized by an absence of planes of delamination in the preform and results in a tough, delamination resistant composite article when the blade preform 230 is impregnated with resin (such as epoxy), metal or other known matrix materials.

The fibers 210 can include, but are not limited to, fibers such as fiberglass, carbon, aromatic polyamides, aramid or para-aramid (e.g., Kevlar®, a registered trademark of E. I. du Pont de Nemours and Company) either alone or in combination. The fibers 210 form a one piece textile "sock" preform 230 that once infiltrated with resin, becomes the "skin" of a wind turbine blade 112.

Figure 3:
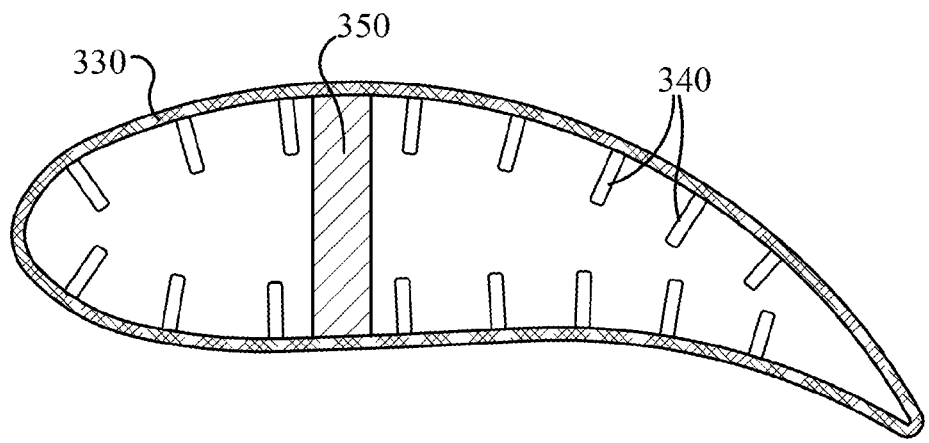
FIG. 3 is a cross-sectional illustration of a wind turbine blade, according to an aspect of the present invention.

FIG. 3 illustrates a cross-sectional view of a wind turbine blade, according to one aspect of the present invention. The "sock" preform 330 can incorporate integral stiffeners 340, which can be co-braided with the preform 330. The stiffeners 340 improve the span-wise flex of the blade and can be designed to improve the overall characteristics of blade 112. The stiffeners 340 may be comprised of unidirectional fibers or filled with continuous unidirectional fibers by a secondary processing operation to provide additional stiffness to the integral stiffeners. A pre-cured composite spar 350 (or stringer) can be added in the span-wise direction to provide increased structural rigidity and shear capability. The spar can also be produced from a braided sock preform for further improvements in quality and structural efficiency.

Figure 4:
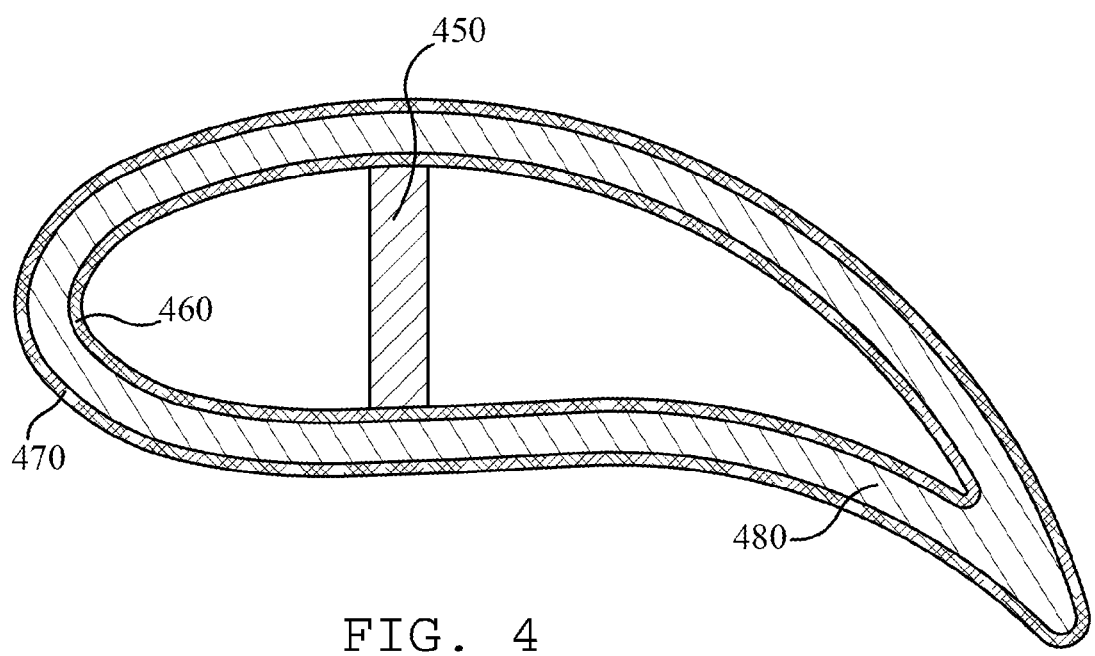
FIG. 4 is a cross-sectional illustration of a wind turbine blade, according to another aspect of the present invention.

FIG. 4 illustrates a cross-sectional view of a wind turbine blade formed using a sandwich-type construction, according to another aspect of the present invention. Two sock preforms, an inner perform 460 and an outer perform 470, can be utilized to encapsulate a mandrel 480 that is "trapped" and co-cured to become the core of the wind turbine blade's skin. The mandrel 480 can be constricted of multi-piece design to facilitate geometry and assembly and may be formed of Balsa wood or any of a number of other core materials such as foam, non-metallic material, small cell material or honeycomb shaped material. The mandrel may also be inflatable and can include pockets to conform to the integral stiffeners (not shown in FIG. 4). A pre-cured composite spar 450 (or stringer) may be added in the span-wise direction to provide increased structural rigidity and shear capability.

By incorporating an engineered textile structure in wind turbine blade 112, the geometry and braid fiber architecture can be optimized to reduce weight and material usage relative to known blade construction without compromising performance or reliability. One advantage the present invention provides is in the one-piece construction of the blade's "skin" surface or sandwich construction.

It will thus be appreciated that many configurations of the present invention reduce fabrication issues with blades, such as, entrained air bubbles, wrinkles, off-axis fibers, regions of disband (delamination) and non-uniform compaction. The construction of the blade also reduces blade weight, and is particularly useful in reducing overall blade/rotor weight in wind turbines at tops of towers. Reduced weight blades will also help to reduce wear on yaw and pitch motors, gears, bearings and other components due to lower blade inertia. Reduced blade weight also reduces the cost and possibility of damage during shipment, as well as, facilitating assembly at wind turbine locations. Many configurations of the present invention also give designers a plurality of ways to adjust the strength and stiffness of blades to achieve improved structural performance.

While the invention has been described in terms of various specific embodiments, those skilled in the art will recognize that the invention can be practiced with modification within the spirit and scope of the claims.

What is claimed is:

1. A blade for a wind turbine comprising:
   a skin comprising a braided fiber sock, the skin comprising a portion of the blade for the wind turbine;
   one or more stiffeners attached to said braided fiber sock; and
   a mandrel substantially encapsulated by the braided fiber sock, the mandrel comprising one or more pockets to conform to the one or more stiffeners.

2. The blade as defined in claim 1, further comprising:
   a pre-cured braided spar, extending in a substantially span-wise direction of said blade and connecting opposing sides of said skin, said pre-cured, braided spar providing span-wise stiffness against bending and carrying all or a portion of transverse shear load.

3. The blade as defined in claim 2, said pre-cured braided spar comprising one or combinations of balsa wood and foam.

4. The blade as defined in claim 1, said braided fiber sock comprising one or combinations of:
   fiberglass, carbon fiber, aromatic polyamide fibers, aramid fibers and para-aramid fibers.

5. The blade as defined in claim 1, said one or more stiffeners comprising unidirectional fibers.

6. The blade as defined in claim 5, wherein said unidirectional fibers provide reinforcement and are placed in said braided fiber sock to provide additional stiffness to said one or more stiffeners.

7. The blade as defined in claim 1, wherein said braided fiber sock is infused with a resin.

8. A blade for a wind turbine, said blade having a skin comprising:
   an inner braided fiber sock;
   an outer braided fiber sock;
   a mandrel connecting said inner braided fiber sock and said outer braided fiber sock, the mandrel comprising one or combinations of balsa wood and foam.

9. The blade as defined in claim 8, each of said inner and outer braided fiber sock comprising one or combinations of:
   fiberglass, carbon fiber, aromatic polyamide fibers, aramid fibers and para-aramid fibers.

10. The blade as defined in claim 8, further comprising:
    a pre-cured, braided spar, extending in a substantially span-wise direction of said blade and connecting opposing sides of said skin, said pre-cured, braided spar providing span-wise stiffness against bending and carrying all or a portion of transverse shear load.

11. The blade as defined in claim 10, said pre-cured, braided spar comprising one or combinations of balsa wood and foam.

12. The blade as defined in claim 8, further comprising:
    one or more stiffeners attached to at least one of said inner braided sock and said outer braided sock.

13. The blade as defined in claim 12, said one or more stiffeners comprising unidirectional fibers.

14. The blade as defined in claim 13, wherein said unidirectional fibers provide reinforcement and are placed in said braided fiber sock to provide additional stiffness to said one or more stiffeners.

15. The blade as defined in claim 12, said mandrel comprising one or more pockets to conform to said one or more stiffeners.

16. A method of making a wind turbine blade, comprising:
    providing a plurality of fibers;
    braiding said plurality of fibers into a fabric preform, the fabric preform comprising an inner fabric perform and an outer fabric perform;
    providing a mandrel during said braiding step to separate said inner and outer fabric performs;
    infusing a resin into said fabric preform to form a hardened shell.

17. The method as defined in claim 16, said braiding step further comprising:
    co-braiding at least one stiffener with said plurality of fibers.

18. The method as defined in claim 16, said braiding step further comprising:
    co-braiding at least one spar with said plurality of fibers.

19. A blade for a wind turbine, the blade having a skin comprising:
    an inner braided fiber sock;
    an outer braided fiber sock;
    a mandrel connecting the inner braided fiber sock and the outer braided fiber sock; and
    a pre-cured, braided spar, extending in a substantially span-wise direction of the blade and connecting opposing sides of the skin, the pre-cured, braided spar providing span-wise stiffness against bending and carrying all or a portion of transverse shear load.

20. The blade as defined in claim 19, the mandrel comprising one or combinations of balsa wood and foam.

21. The blade as defined in claim 19, each of the inner and outer braided fiber sock comprising one or combinations of:
    fiberglass, carbon fiber, aromatic polyamide fibers, aramid fibers or para-aramid fibers.

22. The blade as defined in claim 19, further comprising:
    one or more stiffeners attached to at least one of the inner braided sock and the outer braided sock.

23. The blade as defined in claim 22, the one or more stiffeners comprising unidirectional fibers.

24. The blade as defined in claim 23, wherein the unidirectional fibers provide reinforcement and are placed in the braided fiber sock to provide additional stiffness to the one or more stiffeners.

25. The blade as defined in claim 22, the mandrel comprising one or more pockets to conform to the one or more stiffeners.

26. A blade for a wind turbine, the blade having a skin comprising:
    an inner braided fiber sock;
    an outer braided fiber sock;
    a mandrel connecting the inner braided fiber sock and the outer braided fiber sock;
    one or more stiffeners attached to at least one of the inner braided sock and the outer braided sock; and
    wherein, the mandrel comprises one or more pockets to conform to the one or more stiffeners.

27. The blade as defined in claim 26, the mandrel comprising one or combinations of balsa wood and foam.

28. The blade as defined in claim 26, each of the inner and outer braided fiber sock comprising one or combinations of:
fiberglass, carbon fiber, aromatic polyamide fibers, aramid fibers or para-aramid fibers.

29. The blade as defined in claim 26, further comprising:
a pre-cured, braided spar, extending in a substantially span-wise direction of the blade and connecting opposing sides of the skin, the pre-cured, braided spar providing span-wise stiffness against bending and carrying all or a portion of transverse shear load.

30. The blade as defined in claim 29, the pre-cured, braided spar comprising one or combinations of balsa wood or foam.

31. The blade as defined in claim 26, the one or more stiffeners comprising unidirectional fibers.

32. The blade as defined in claim 31, wherein the unidirectional fibers provide reinforcement and are placed in the braided fiber sock to provide additional stiffness to the one or more stiffeners.

* * * * *